United States Patent
Dohi et al.

(10) Patent No.: US 10,309,561 B2
(45) Date of Patent: Jun. 4, 2019

(54) FLOW PASSAGE SEALING STRUCTURE

(71) Applicant: FUJIKIN INCORPORATED, Osaka (JP)

(72) Inventors: Ryousuke Dohi, Osaka (JP); Naofumi Yasumoto, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 311 days.

(21) Appl. No.: 15/107,044

(22) PCT Filed: Dec. 22, 2014

(86) PCT No.: PCT/JP2014/006386
§ 371 (c)(1),
(2) Date: Jun. 21, 2016

(87) PCT Pub. No.: WO2015/098087
PCT Pub. Date: Jul. 2, 2015

(65) Prior Publication Data
US 2017/0037987 A1    Feb. 9, 2017

(30) Foreign Application Priority Data

Dec. 26, 2013    (JP) ................. 2013-269780

(51) Int. Cl.
*F16L 55/027*    (2006.01)
*F16L 15/00*    (2006.01)
(Continued)

(52) U.S. Cl.
CPC ........... *F16L 15/008* (2013.01); *F16L 55/027* (2013.01); *G01F 1/42* (2013.01); *G01F 15/005* (2013.01); *G05D 7/0635* (2013.01)

(58) Field of Classification Search
CPC ................. F16L 55/027; G01F 1/42
(Continued)

(56) References Cited

U.S. PATENT DOCUMENTS 595,338 A * 12/1897 Parkin ................... F16L 25/023
285/353
2,626,820 A * 1/1953 Dons ......................... G01F 1/42
138/45

(Continued)

FOREIGN PATENT DOCUMENTS

DE    843777 C *  7/1952 ............ F16L 55/027
EP    1 918 799 A1    5/2008
(Continued)

OTHER PUBLICATIONS

International Search Report issued in corresponding application PCT/JP2014/006386, completed Mar. 26, 2015 and dated Apr. 7, 2015.

*Primary Examiner* — David Bochna
(74) *Attorney, Agent, or Firm* — Griffin and Szipl PC

(57)    ABSTRACT

A flow passage sealing structure for omitting a process of welding or caulking an orifice plate and a filter plate to an orifice base and a filter base as base materials and allowing further miniaturization, includes a main block (1) including main flow passages (1a, 1b), recessed portions (12, 13) provided in side surfaces of the main block and having female screws in inner peripheral surfaces, thin plates (6, 8) abutting against the bottom surfaces of the recessed portions and having through holes, gasket rings (16, 17) abutting against the thin plates (6, 8), pressing pipelines (20, 21) having large-diameter portions and internal flow passages communicable with the main flow passages (1a, 1b) and abutting against the gasket rings, and fastening screws (22) abutting against the large-diameter portions and pressing the
(Continued)

pressing pipelines by being inserted around the outside of the pressing pipelines and screwed into the female screws.

12 Claims, 5 Drawing Sheets

(51) Int. Cl.
    *G01F 1/42*     (2006.01)
    *G01F 15/00*     (2006.01)
    *G05D 7/06*     (2006.01)

(58) Field of Classification Search
    USPC .............................. 285/353; 138/40, 41, 44
    See application file for complete search history.

(56) References Cited

U.S. PATENT DOCUMENTS

| | | | | |
|---|---|---|---|---|
| 2,661,768 | A * | 12/1953 | Novak | G01F 1/42 285/93 |
| 2,774,616 | A * | 12/1956 | Dodd | H01P 1/042 285/353 |
| 3,749,122 | A * | 7/1973 | Gold | F16K 15/063 138/44 |
| 3,792,609 | A * | 2/1974 | Blair | G01F 1/40 138/41 |
| 4,324,112 | A * | 4/1982 | Fujiwara | F25B 41/06 138/40 |
| 4,356,997 | A * | 11/1982 | Beffano | F16K 41/06 138/44 |
| 4,427,222 | A * | 1/1984 | Abbes | F16L 55/1152 285/353 |
| 4,665,960 | A * | 5/1987 | Brzezicki | F16L 25/00 285/353 |
| 4,801,158 | A * | 1/1989 | Gomi | F16L 25/0036 285/353 |
| 5,054,822 | A * | 10/1991 | McGushion | F16L 19/02 285/353 |
| 6,810,683 | B2 * | 11/2004 | Eustice | F25B 41/062 138/41 |
| 9,127,796 | B2 | 9/2015 | Hirose et al. | |
| 9,133,951 | B2 | 9/2015 | Ohmi et al. | |
| 2009/0171507 | A1 | 7/2009 | Ohmi et al. | |
| 2011/0315905 | A1 | 12/2011 | Hirose et al. | |

FOREIGN PATENT DOCUMENTS

| | | | | |
|---|---|---|---|---|
| FR | 1025206 A | * | 4/1953 | ............ F16L 55/027 |
| JP | 2000-167318 A | | 6/2000 | |
| JP | 2003-074798 A | | 3/2003 | |
| JP | 2005-149075 A | | 6/2005 | |
| JP | 2007-057474 A | | 3/2007 | |
| JP | 2010-151698 A | | 7/2010 | |
| WO | 2007/023597 A1 | | 3/2007 | |
| WO | 2010/073473 A1 | | 7/2010 | |

* cited by examiner

US 10,309,561 B2

FLOW PASSAGE SEALING STRUCTURE

This is a National Phase Application in the United States of International Patent Application No. PCT/JP2014/006386 filed Dec. 22, 2014, which claims priority on Japanese Patent Application No. 2013-269780, filed Dec. 26, 2013. The entire disclosures of the above patent applications are hereby incorporated by reference.

TECHNICAL FIELD

The present invention relates to a flow passage sealing structure, and in particular to a flow passage sealing structure in which a thin plate having a through hole, such as an orifice plate or a filter plate, is provided within a flow passage of a main block of an apparatus such as a pressure-type flow rate control apparatus.

BACKGROUND ART

A conventional pressure-type flow rate control apparatus, for example, is configured by coupling a main block 1 that has main flow passages 1a and 1b, an inlet-side block 2 that has an inlet-side flow passage 2a, and an outlet-side block 3 that has an outlet-side flow passage 3a together so that the flow passages 2a, 1a, 1b, and 3a communicate with one another, as illustrated in FIG. 8. A valve body 4, such as a metal diaphragm valve, that is provided between the main flow passages 1a and 1b is openable and closable by a piezoelectric actuator 5 that is attached to the main block 1 (see Patent Document 1).

Known structures include a structure in which a gasket-type orifice 7 with an orifice plate 6 fixed thereto for use in flow rate control is inserted between the outlet-side block 3 and the main block 1 (Patent Document 1), and a structure in which a filter gasket 9 with a filter plate 8 fixed thereto is inserted between the inlet-side block 2 and the main block 1 (e.g., Patent Documents 1 to 4).

In this type of pressure-type flow rate control apparatus 10, when a so-called critical expansion condition of $(P_1/P_2)$ ≥approx. 2 holds between a downstream pressure $P_2$ and an upstream pressure $P_1$ of the orifice plate 6, the flow rate Q of a gas flowing through the orifice of the orifice plate 6 is given by the relationship $Q=KP_1$ (where K is a constant).

Using such a relationship enables high-precision control of the flow rate Q by controlling the pressure $P_1$ detected by a pressure sensor 11, and achieves such excellent characteristics that even when the pressure of a gas $G_0$ on the upstream side of the valve body 4 changes greatly, the controlled flow rate value hardly changes.

The orifice plate or the filter plate is typically fixed by welding to an orifice base or a filter base. In the case of a sintered filter plate that cannot be welded, a method is also known, in which an annular lip is provided at, for example, the filter base and bent (caulked) inward to fix the filter plate (e.g., Patent Document 3). There is also a method in which the orifice base or the filter base is divided into halves that are able to fit together, and when both halves are fitted together, the orifice plate or the filter plate is inserted between the halves (e.g., Patent Documents 1, 2, and 4). In the case of using such a halved base, typically the orifice plate or the filter plate is laser-welded to one half of the orifice base.

PRIOR ART DOCUMENTS

Patent Documents

Patent Document 1: Japanese Published Unexamined Patent Application No. 2010-151698
Patent Document 2: Japanese Published Unexamined Patent Application No. 2007-057474
Patent Document 3: Japanese Published Unexamined Patent Application No. 2005-149075
Patent Document 4: Japanese Published Unexamined Patent Application No. 2000-167318

SUMMARY OF THE INVENTION

Technical Problem

The welding or caulking of the orifice plate and the filter plate to fix the plates is, however, not easy because the plates themselves are minute (e.g., 3.5 mm in diameter).

Also, in recent years, apparatuses have rapidly become smaller and thinner, and it has become difficult to apply conventional sealing structures, particularly, structures using halved bases, since there is a limit to how small and thin the structures can be made.

It is a principal object of the present invention to provide a sealing structure that is able to omit a process of welding or caulking an orifice plate or a filter plate to an orifice base or a filter base, which is a base material, and allows for further miniaturization.

Solution to Problem

In order to achieve the object described above, a flow passage sealing structure according to the present invention includes a main block having a main flow passage, a recessed portion provided in the main block, with the main flow passage being open at a bottom of the recessed portion, and a female screw being provided in an inner peripheral surface of the recessed portion, a thin plate that abuts against the bottom of the recessed portion and has a through hole, a gasket ring that abuts against the thin plate, a pressing pipeline that has an internal flow passage and a large-diameter portion and abuts against the gasket ring, the inner flow passage being communicable with the main flow passage, and a fastening screw that has an insertion hole in an axial direction and abuts against the large-diameter portion and presses the pressing pipeline by being inserted around an outside of the pressing pipeline via the insertion hole and screwed into the female screw.

The pressing pipeline may further include an anti-corotation mechanism that prevents the pressing pipe from corotating with the fastening screw.

The anti-corotation mechanism may include an engaged portion that is provided in the large-diameter portion, and an engaging portion that is provided in the main block and engages the engaged portion.

The engaged portion may be a detent surface that is formed by cutting away an outer peripheral surface of the large-diameter portion into a flat surface, and the engaging portion may be a dowel pin that press-fits in the main block.

Alternatively, the anti-corotation mechanism may include an anti-corotation member that is provided between the large-diameter portion and the fastening screw.

The large-diameter portion may have a pressing surface that presses the gasket ring.

At least one of the bottom of the recessed portion and the gasket ring may have a thin-plate recess in which the thin plate is fittable.

The thin-plate recess may have an annular bearing surface and an annular groove that is provided in an outer peripheral edge of the bearing surface. The bearing surface may be a flat surface.

The bottom of the recessed portion may have a gasket-ring recess in which an end of the gasket ring fits, and the thin-plate recess may be located in the gasket-ring recess.

In one embodiment, the thin plate is an orifice plate, and an inner surface of the main flow passage that faces onto the orifice plate widens in a tapered shape.

Effects of the Invention

According to the present invention, a process of welding or caulking can be omitted, by pressure-welding a thin plate having a hole, such as an orifice plate or a filter plate, to the bottom of the recessed portion of the main block and the gasket ring and by using both surfaces of the orifice plate or the filter plate as sealing surfaces. The main block also has a recessed portion that is provided with a female screw and into which the main flow passage opens. The thin plate, the gasket ring, a pressing pipeline, and the fastening screw are housed in the stated order in the recessed portion, thus enabling the structure to be made smaller and thinner.

BRIEF DESCRIPTION OF THE DRAWINGS

FIG. 1(a) is a partial cross-sectional front view, and FIG. 1(b) is a partial cross-sectional side view taken along line b-b in FIG. 1(a).

EMBODIMENTS FOR IMPLEMENTING THE INVENTION

Figure 1:
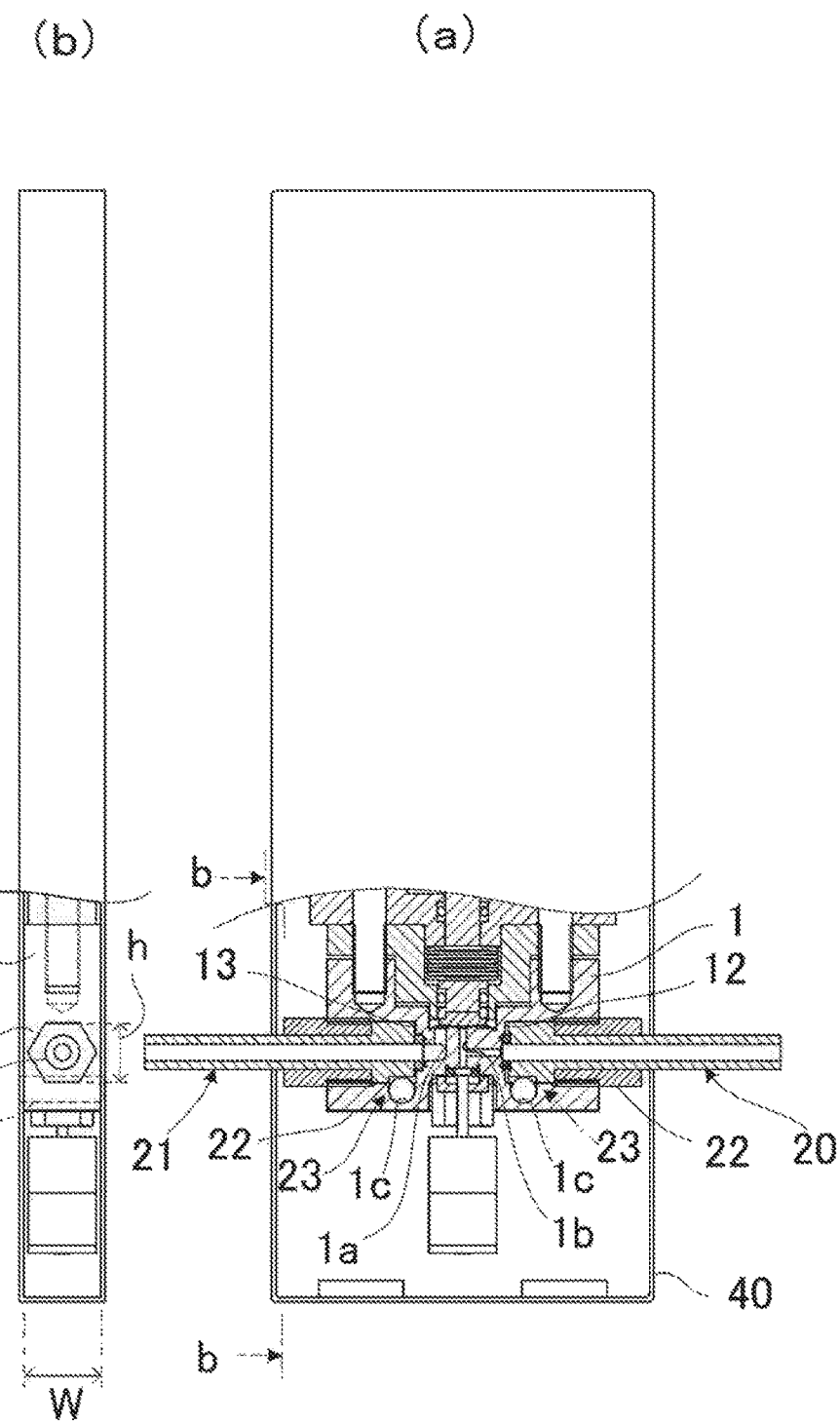
FIG. 1 A pressure-type flow rate control apparatus that adopts a flow passage sealing structure according to the present invention.
Figure 2:
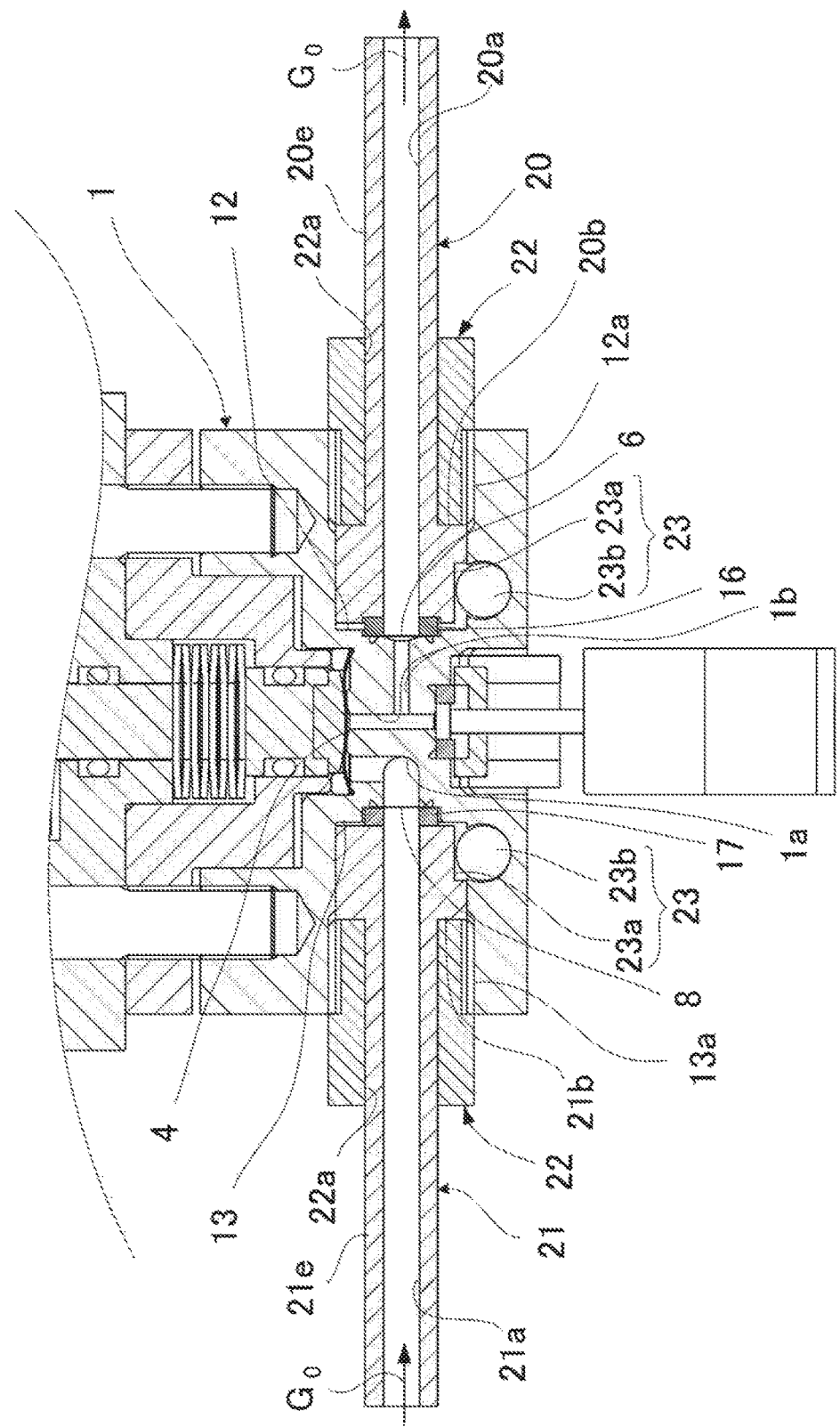
FIG. 2 A partial enlarged view of FIG. 1(a).
Figure 3:
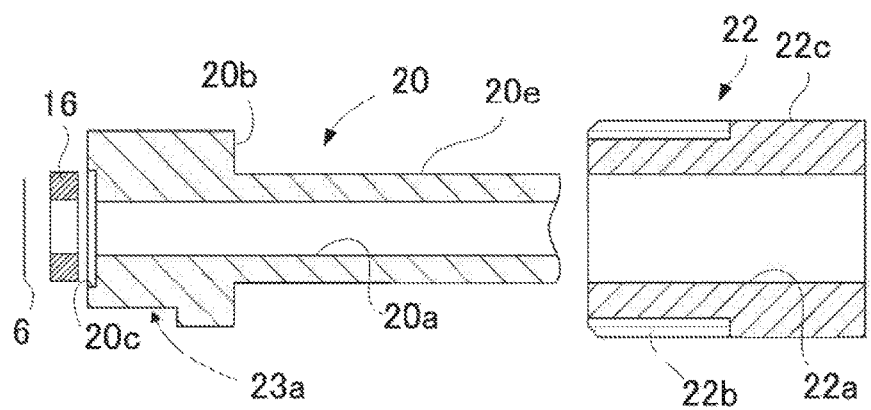
FIG. 3 An enlarged exploded cross-sectional view of components shown in FIG. 1(a).
Figure 4:
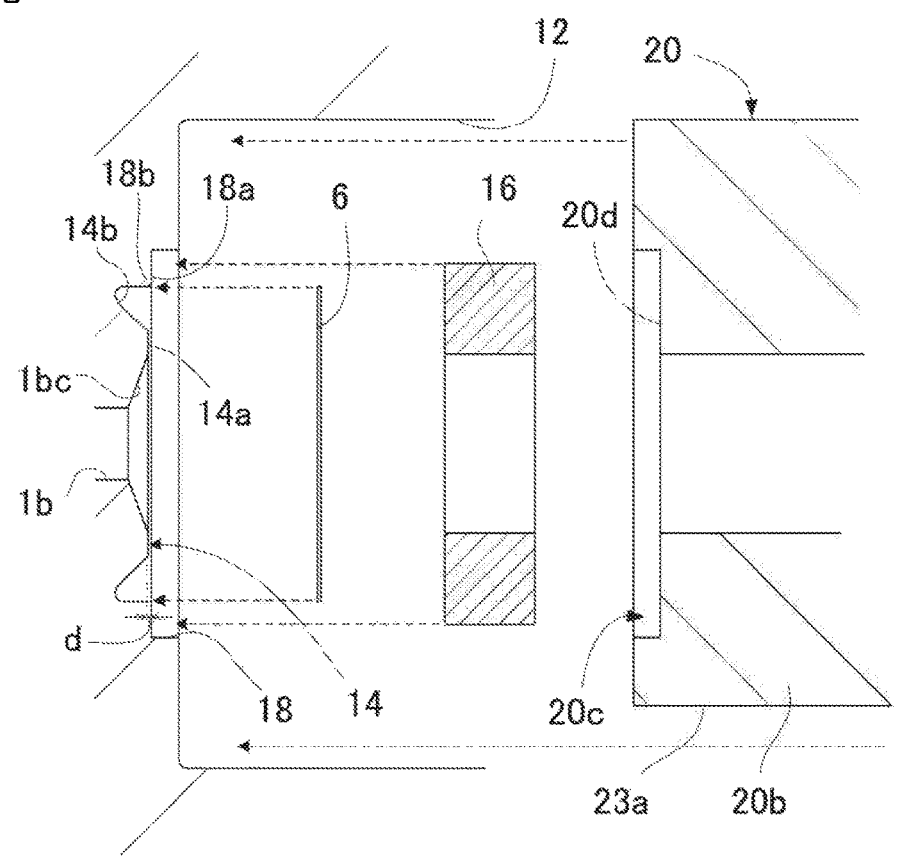
FIG. 4 An enlarged exploded cross-sectional view of components shown in FIG. 1(a).
Figure 5:
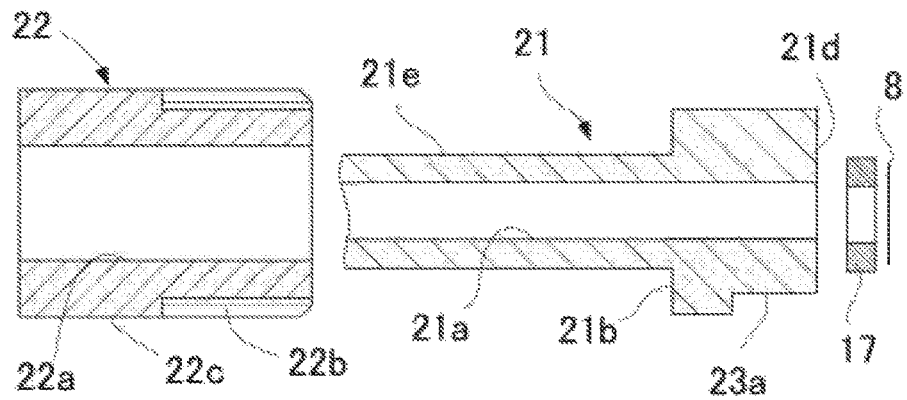
FIG. 5 An enlarged exploded cross-sectional view of components shown in FIG. 1(a).
Figure 6:
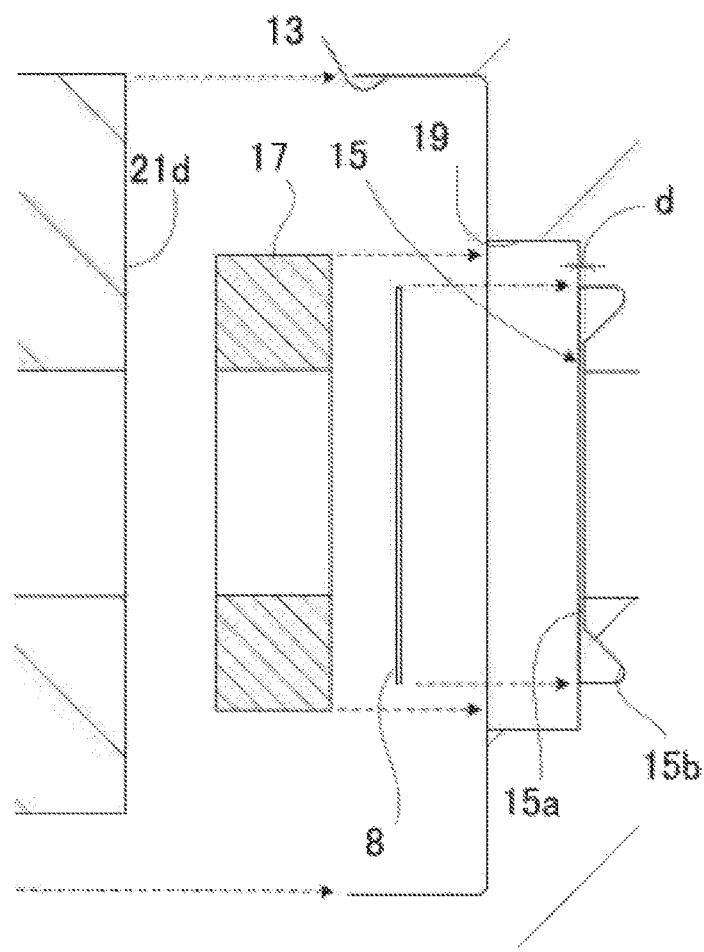
FIG. 6 An enlarged exploded cross-sectional view of components shown in FIG. 1(a).
Figure 7:
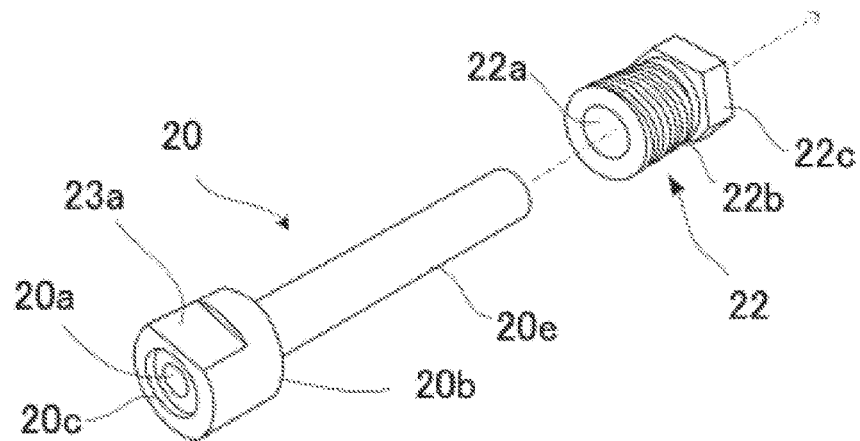
FIG. 7 A perspective view of a pressing pipeline and a fastening screw, which are constituent elements according to the present invention.
Figure 8:
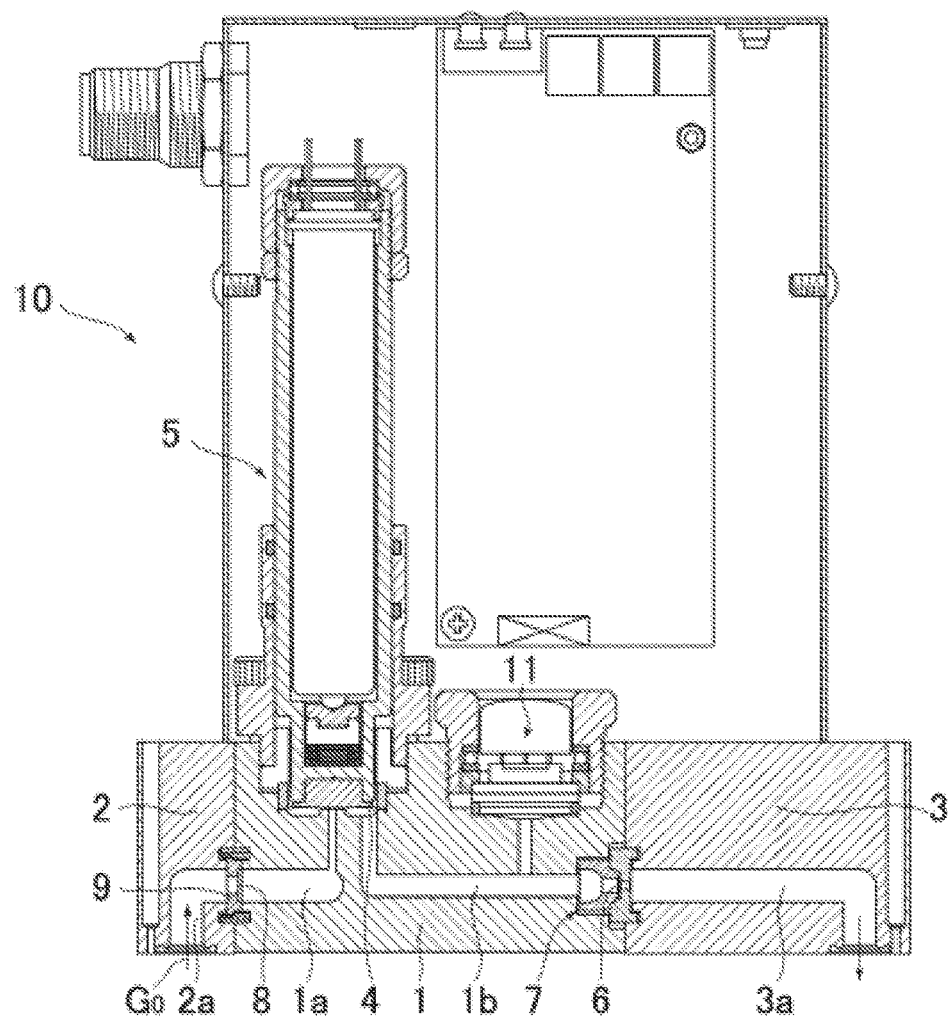
FIG. 8 A longitudinal cross-sectional front view of a pressure-type flow rate control apparatus that includes a conventional flow passage sealing structure.

Hereinafter, an embodiment of a flow passage sealing structure according to the present invention will be described with reference to FIGS. 1 to 7. The following description omits detailed illustration and description of components such as valve bodies and actuators that are similar to those in conventional structures. Note that a piezoelectric actuator is hidden from view inside a case 40 and thus not shown in FIG. 1. Components that are similar to those of the conventional example described above are given the same reference numerals.

A main block 1 has main flow passages 1a and 1b therein. The main block 1 has recessed portions 12 and 13 in the side surfaces on both sides. The main flow passages 1b and 1a are respectively open at the bottoms of the recessed portions 12 and 13. The recessed portion 12 has a female screw 12a on the inner peripheral surface on the outlet side, and the recessed portion 13 has a female screw 13a on the inner peripheral surface on the inlet side. Note that the screw threads of the female screws 12a and 13a are shown in abbreviated form in FIGS. 1 and 2.

An orifice plate 6 that is a thin plate having an orifice (through hole) abuts against the bottom of the recessed portion 12, which is provided with the main flow passage 1b. The orifice plate 6 may be a conventionally known orifice plate.

A filter plate 8 that is a thin plate having multiple through holes abuts against the bottom of the recessed portion 13, which is provided with the main flow passage 1a. The filter plate 8 may be a conventionally known filter plate.

The bottoms of the recessed portions 12 and 13 respectively have thin-plate recesses 14 and 15 (see FIGS. 4 and 6) in which the orifice plate 6 and the filter plate 8, which are thin plates, are respectively fittable. The thin-plate recesses 14 and 15 are useful in positioning the orifice plate 6 and the filter plate 8.

The thin-plate recesses 14 and 15 respectively have annular bearing surfaces 14a and 15a against which the orifice plate 6 and the filter plate 8 abut respectively, and annular grooves 14b and 15b that are provided in the outer peripheries of the bearing surfaces 14a and 15b. The presence of the annular grooves 14b and 15b reduces the areas of the bearing surfaces 14a and 15a, thus increasing the pressure applied from the bearing surfaces 14a and 15a respectively to the orifice plate 6 and the filter plate 8. The bearing surfaces 14a and 15a may be flat surfaces in order to ensure a desired sealing performance.

The orifice plate 6 may be a known orifice plate and made of materials such as stainless steel or alloy (e.g., stainless steel with a hardness of 270 to 350 Hv). In the illustrated example, a stainless steel thin plate having a diameter of 3.5 mm and a thickness of 50 μm has an orifice having a diameter of 100 μm.

The filter plate 8 may be a known filter plate and may be made of materials such as stainless steel, alloy, or ceramic. The filter plate 8 may, for example, be a thin plate that has a thickness of 20 to 50 μm and has a large number of through holes (having an inner diameter that is approximately the same as the thickness) in portions other than the outer peripheral edge.

The orifice plate 6 and the filter plate 8 respectively abut against gasket rings 16 and 17. The gasket rings 16 and 17 may be made of, for example, stainless steel with a hardness of 100 to 130 Hv. In the illustrated example, annealed SUS316L is used.

The main block may, for example, be made of a metal such as stainless steel or alloy with a hardness of 130 to 200 Hv.

The bottoms of the recessed portions 12 and 13 respectively have gasket-ring recesses 18 and 19 (see FIGS. 4 and 6) in which axial ends of the gasket rings 16 and 17 respectively fit. The thin-plate recesses 14 and 15 are formed in the bottoms of the gasket-ring recesses 18 and 19. In the illustrated example, a level difference d (FIGS. 4 and 6) between the bearing surfaces 14a, 15a and the gasket-ring recesses 18, 19 is configured to be the same as the thickness of the orifice plate 6 and the filter plate 8. Thus, when the orifice plate 6 and the filter plate 8 are respectively abutted against the bearing surfaces 14a and 15a, surfaces of the orifice plate 6 and the filter plate 8 respectively coincide with the bottom surfaces of the gasket-ring recesses 18 and 19. Note that the level difference d need only be less than or equal to the thickness of the orifice plate 6 and the filter plate 8. A similar sealing effect will also be achieved even without the level difference d. Alternatively, the gasket rings 16 and 17 may have thin-plate recesses (not shown), instead of the gasket-ring recesses 18 and 19 having the thin-plate recesses 14 and 15 in the bottom. As another alternative, although not shown, both of the gasket rings 16 and 17 and the gasket-ring recesses 18 and 19 may have thin-plate recesses.

The bearing surfaces 14a and 15a having an annular shape and the gasket rings 16 and 17 are formed to have the same inner diameter.

An inner surface 1bc (FIG. 4) of the main flow passage 1b that faces onto the orifice plate 6 widens in a tapered shape. This is because the main flow passage 1b located between a valve body 4 (FIG. 2) and the orifice plate 6 has a small flow passage diameter to improve gas replacement properties in the main flow passage 1b.

The gasket rings 16 and 17 respectively abut against pressing pipelines 20 and 21. The pressing pipelines 20 and 21 respectively have internal flow passages 20a and 21a and large-diameter portions 20b and 21b. The internal flow passages 20a and 21a extend in the axial direction and are respectively communicable with the main flow passages 1b and 1a.

The pressing pipelines 20 and 21 may, for example, be made of a metal such as stainless steel or alloy with a hardness of 130 to 200 Hv.

In the illustrated example, the pressing pipeline 20 also has a gasket-ring recess 20c in which an axial end of the gasket ring 16 fits. The gasket ring 16 may be positioned by being fitted into the gasket-ring recess 14 and the gasket-ring recess 20c on either side. Note that the structure may include only one of the gasket-ring recess 14 and the gasket-ring recess 20c.

The large-diameter portions 20b and 21b respectively have pressing surfaces 20d and 21d that respectively press the gasket rings 16 and 17. The large-diameter portions 20b and 21b are thus provided at one end of the pressing pipelines 20 and 21. To minimize the dimensions of the pressing pipelines 20 and 21, the large-diameter portions 20b and 21b may preferably be provided at the axial ends as in the illustrated example, but when only the function of the large-diameter portions 20b and 21b as flanges for receiving fastening screws 22 is focused on, as will be described later, the large-diameter portions 20b and 21b may be provided in portions (e.g., middle portions in the axial direction) other than the axial ends of the pressing pipelines 20 and 21.

The fastening screws 22 are inserted around the outside of small-diameter tubular portions 20e and 21e of the pressing pipelines 20 and 21. The fastening screws 22 each have an insertion hole 22a that extends axially to allow the fastening screw 22 to be inserted around the outside of the small-diameter tubular portions 20e and 21e, and an external thread portion 22b. Note that the external thread portion 22b is shown in abbreviated form in FIGS. 3 and 5. The fastening screws 22 abut against the large-diameter portions 20b and 21b and press the pressing pipelines 20 and 21 against the gaskets 16 and 17 by being screwed into the female screws 12a and 13a of the recessed portions 12 and 13. Heads 22c of the fastening screws 22 may have a hexagonal shape similar to the shape of a typical hexagon head bolt. Preferably, the minimum outer diameter of the heads 22c (distance h between two opposing sides of the hexagon (FIG. 1(b)) may be the same as the outer diameter of the external thread portion 22b to make the dimensions of the heads 22c as small as possible. The small-diameter tubular portions 20e and 21e are longer than the fastening screws 22 and protrude from the fastening screws 22. The protrusions of the small-diameter tubular portions 20e and 21e are coupled to, for example, other pipelines, which are not shown.

An anti-corotation mechanism 23 is provided to prevent corotation of the pressing pipelines 20 and 21 when the fastening screws 22 are screwed in. This is because corotation of the pressing pipelines 20 and 21 may lead to corotation of the gasket rings 16 and 17, and such corotating gasket rings 16 and 17 may damage the orifice plate 6 and the filter plate 8 that are machined with high precision.

The anti-corotation mechanism 23 may include engaged portions 23a that are provided in the large-diameter portions 20b and 21b, and engaging portions 23b that are provided in the main block 1 and engage the engaged portions 23a.

The engaged portions 23a may be detent surfaces that are formed by cutting away the outer peripheral surfaces of the large-diameter portions 20b and 21b into flat surfaces (see also FIG. 7), and the engaging portions 23b may be dowel pins that are press-fitted into insertion holes 1c of the main block 1. In this case, engagement is achieved by press-fitting the dowel pins in parallel with the flat surfaces and abutting side surfaces of the parallel pins against detent surfaces. The dowel pins, which are press-fitted and fixed in the insertion holes 1c (FIG. 1) of the main block 1, are suitable in terms of feasibility and miniaturization. The engaging portions 23b may be other dowel pins such as spring pins or threaded stop pins.

The anti-corotation mechanism need only be a mechanism capable of preventing the pressing pipelines 20 and 21 from corotating with the fastening screws 22, and may be another known detent mechanism to be used as a detent for machine parts. For example, the mechanism may be configured such that the large-diameter portions have a polygonal outside shape such as a hexagonal shape, and the inner peripheral shape of portions of the inner surfaces of the recessed portions 12 and 13 in which the large-diameter portions fit is a polygonal shape in which the large-diameter portions fits. Alternatively, the mechanism may have a configuration in which a key and a key groove are engaged with each other.

As another alternative, the anti-corotation mechanism may be sliding members (not shown), such as thrust rings, that are provided between the large-diameter portions 20b and 21b and the fastening screws 22 and that have a smaller thrust bearing and a smaller coefficient of kinetic friction than the large-diameter portions 20b and 21b. The presence of such sliding members prevents the gasket rings 16 and 17, the orifice plate 6, and the filter plate 8 from corotating with the fastening screws 22 when the fastening screws 22 are tightened.

In assembling the components of the flow passage sealing structure having the above-described configuration, for example, the main block 1 is placed with the gas outlet side (upper side in FIG. 2) of the recessed portion 12 facing upward (i.e., the bottom side facing downward), and the orifice plate 6 is inserted into the recessed portion 12 to abut against the bearing surface 14a at the bottom of the recessed portion 12. At this time, the orifice plate 6 can be positioned by being fitted into the thin-plate recess 14. Next, the gasket ring 16 is inserted into the recessed portion 12 of the main block 1 and housed in the gasket recess 14 at the bottom of the recessed portion 12 to abut against the orifice plate 6. Then, the pressing pipeline 20 is inserted into the recessed portion 12 to abut against the gasket ring 16. The dowel pin serving as the engaging portion 23b for preventing corotation is engaged with the pressing pipeline 20, i.e., the detent surface serving as the engaged portion 23a. The dowel pin serving as the engaging portion 23b may be set in advance prior to the insertion of the pressing pipeline 20 into the recessed portion 12. Finally, the fastening screw 22 is inserted into the recessed portion 12, screwed into the female screw 12a of the recessed portion 12, and tightened with a predetermined tightening torque to press the gasket ring 16 and seal both surfaces of the orifice plate 6 with the bearing surface 14a and the gasket ring 16. In the illustrated example, the gasket ring 16 abuts against not only the orifice plate 6 but also the bottom surface 18a of the gasket-ring recess 1. Thus, sealing is also provided at the bottom surface 18a and edge portion 18b of the gasket-ring recess 18. The filter plate 8 is also incorporated using a similar method to the orifice plate 6. The female screws 12a and 13a are threaded to a predetermined depth at which the pressing pipelines 20 and 21 do not excessively press the gasket rings 16 and 17.

In the flow passage sealing structure having the above-described configuration, the orifice plate 6 and the filter plate 8, which are thin plates, are pressed against the bottoms of the recessed portions 12 and 13 of the main block 1 and the gasket rings 16 and 17, and both surfaces of the orifice plate 6 and the filter plate 8 are used as sealing surfaces. This eliminates the need for the process of welding or caulking.

The pressing pipelines 20 and 21 integrate piping and a mechanism for pressing the gasket rings 16 and 17. This reduces the number of parts and contributes to miniaturization. Forming the recessed portions 12 and 13 in the main block 1, inserting the pressing pipelines 20 and 21 into the recessed portions 12 and 13, and screwing the fastening screws 22 into the pressing pipelines 20 and 21 also contributes to miniaturization. Moreover, the configuration in which the fastening screws 22 inserted around the outside of the pressing pipelines 20 and 21 are used to press the pressing pipelines 20 and 21 and screwed into the female screws 12a and 13a provided in the recessed portions 12 and 13 of the main block 1 also allows for miniaturization. In particular, the dimension W of the thickness of the main block 1 (see FIG. 1) is reduced to enable a thinner structure. In the illustrated example, the thickness dimension W is 10 mm.

The interpretation of the present invention is not intended to be limited to the embodiments described above, and various changes can be made without departing from the scope of the present invention.

DESCRIPTION OF REFERENCE SIGNS

1 Main block
1a, 1b Main flow passage
12, 13 Recessed portion
12a, 13a Female screw
6, 8 Thin plate
14, 15 Thin-plate recess
14a, 15a Bearing surface
14b, 15b Annular groove
16, 17 Gasket ring
18, 19 Gasket-ring recess
20a, 21a Internal flow passage
20b, 21b Large-diameter portion
20, 21 Pressing pipeline
22a Insertion hole
22 Fastening screw
23 Anti-corotation mechanism
23a Engaged portion
23b Engaging portion
20d, 21d Pressing surface

The invention claimed is:

1. A flow passage sealing structure comprising:
a main block having a main flow passage;
a recessed portion provided in the main block, with the main flow passage being open at a bottom of the recessed portion, and a female screw being provided in an inner peripheral surface of the recessed portion;
a thin plate that abuts against the bottom of the recessed portion and has a through hole;
a gasket ring that abuts against the thin plate;
a pressing pipeline that has an internal flow passage and a large-diameter portion and abuts against the gasket ring, the inner flow passage being communicable with the main flow passage; and
a fastening screw that has an insertion hole in an axial direction and abuts against the large-diameter portion and presses the pressing pipeline by being inserted around an outside of the pressing pipeline via the insertion hole and screwed into the female screw; and
wherein the bottom of the recessed portion has a gasket-ring recess in which an end of the gasket ring fits.

2. The flow passage sealing structure according to claim 1, wherein the pressing pipeline further comprises an anti-corotation mechanism that prevents the pressing pipe from corotating with the fastening screw.

3. The flow passage sealing structure according to claim 2, wherein the anti-corotation mechanism includes an engaged portion that is provided in the large-diameter portion, and an engaging portion that is provided in the main block and engages the engaged portion.

4. The flow passage sealing structure according to claim 3, wherein the engaged portion is a detent surface that is formed by cutting away an outer peripheral surface of the large-diameter portion into a flat surface, and the engaging portion is a dowel pin that press-fits in the main block.

5. The flow passage sealing structure according to claim 2, wherein the anti-corotation mechanism includes a sliding member provided between the large-diameter portion and the fastening screw.

6. The flow passage sealing structure according to claim 1, wherein the large-diameter portion has a pressing surface that presses the gasket ring.

7. The flow passage sealing structure according to claim 1, wherein at least one of the bottom of the recessed portion and the gasket ring has a thin-plate recess in which the thin plate is fittable.

8. The flow passage sealing structure according to claim 1, wherein the bottom of the recessed portion has an annular bearing surface against which the thin plate abuts, and an annular groove that is provided in an outer peripheral edge of the bearing surface.

9. The flow passage sealing structure according to claim 8, wherein the bearing surface is a flat surface.

10. The flow passage sealing structure according to claim 1, wherein the thin plate is an orifice plate, and an inner surface of the main flow passage that faces onto the orifice plate widens in a tapered shape.

11. A flow passage sealing structure comprising:
a main block having a main flow passage;
a recessed portion provided in the main block, with the main flow passage being open at a bottom of the recessed portion, and a female screw being provided in an inner peripheral surface of the recessed portion;
a thin plate that abuts against the bottom of the recessed portion and has a through hole;
a gasket ring that abuts against the thin plate;
a pressing pipeline that has an internal flow passage and a large-diameter portion and abuts against the gasket ring, the inner flow passage being communicable with the main flow passage; and
a fastening screw that has an insertion hole in an axial direction and abuts against the large-diameter portion and presses the pressing pipeline by being inserted around an outside of the pressing pipeline via the insertion hole and screwed into the female screw;

wherein the pressing pipeline further comprises an anti-corotation mechanism that prevents the pressing pipe from co-rotating with the fastening screw;

wherein the anti-corotation mechanism includes an engaged portion that is provided in the large-diameter portion, and an engaging portion that is provided in the main block and engages the engaged portion; and wherein the engaged portion is a detent surface that is formed by cutting away an outer peripheral surface of the large-diameter portion into a flat surface, and the engaging portion is a dowel pin that press-fits in the main block.

12. A flow passage sealing structure comprising:

a main block having a main flow passage;

a recessed portion provided in the main block, with the main flow passage being open at a bottom of the recessed portion, and a female screw being provided in an inner peripheral surface of the recessed portion;

a thin plate that abuts against the bottom of the recessed portion and has a through hole;

a gasket ring that abuts against the thin plate;

a pressing pipeline that has an internal flow passage and a large-diameter portion and abuts against the gasket ring, the inner flow passage being communicable with the main flow passage; and a fastening screw that has an insertion hole in an axial direction and abuts against the large-diameter portion and presses the pressing pipeline by being inserted around an outside of the pressing pipeline via the insertion hole and screwed into the female screw; and wherein at least one of the bottom of the recessed portion and the gasket ring has a thin-plate recess in which the thin plate is fittable.

* * * * *